United States Patent
Pajon

(10) Patent No.: US 6,652,000 B2
(45) Date of Patent: Nov. 25, 2003

(54) SYSTEM FOR A VEHICLE, COMPRISING AN OPERATING DEVICE DESIGNED TO OPERATE AN ACTUATOR SELECTIVELY ACCORDING TO A VALUE MEASURED BY A MEASURING DEVICE ARRANGED IN A SEAT

(75) Inventor: Marc Pajon, Prunay en Yvlines (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 11 days.

(21) Appl. No.: 09/930,861

(22) Filed: Aug. 16, 2001

(65) Prior Publication Data

US 2002/0021215 A1 Feb. 21, 2002

(30) Foreign Application Priority Data

Aug. 21, 2000 (FR) .............................. 00 10752

(51) Int. Cl.[7] .............................................. B60R 21/32
(52) U.S. Cl. ...................................................... 280/735
(58) Field of Search ................................ 280/735, 734; 180/271, 273

(56) References Cited

U.S. PATENT DOCUMENTS

| | | | |
|---|---|---|---|
| 5,001,023 A | * | 3/1991 | Cheshire et al. ............... 429/94 |
| 5,411,289 A | * | 5/1995 | Smith et al. ................. 280/735 |
| 5,446,391 A | | 8/1995 | Aoki et al. .................. 324/661 |
| 5,722,686 A | | 3/1998 | Blackburn et al. .......... 280/735 |
| 5,739,757 A | | 4/1998 | Gioutsos ..................... 340/667 |
| 5,900,677 A | * | 5/1999 | Musiol et al. .............. 307/10.1 |
| 5,997,033 A | | 12/1999 | Gray et al. .................. 280/735 |
| 6,043,743 A | | 3/2000 | Saito et al. .................. 340/562 |
| 6,079,738 A | | 6/2000 | Lotito et al. ................. 280/735 |
| 6,292,727 B1 | * | 9/2001 | Norton ......................... 701/45 |
| 6,329,542 B1 | * | 12/2001 | Godfrey et al. ............. 560/186 |

FOREIGN PATENT DOCUMENTS

| | | |
|---|---|---|
| WO | WO 98/49031 | 11/1998 |
| WO | WO 00/25098 | 5/2000 |

OTHER PUBLICATIONS

French Preliminary Search Report dated May 3, 2001, Appl. No. FR 0010752.

* cited by examiner

*Primary Examiner*—Paul N. Dickson
*Assistant Examiner*—Faye M. Fleming
(74) *Attorney, Agent, or Firm*—McCracken & Frank

(57) ABSTRACT

System for a vehicle that has a seat fitted with a measuring device of the electromagnetic field type, an airbag arranged to protect the occupant of the seat in the event of an accident, this airbag having several modes of operation, and an operating device designed to cause the airbag to inflate in the event of an accident, selectively according to one of the modes of operation of this airbag on the basis of a parameter representing the mass of the occupant of the seat, as measured by the electromagnetic field-type measuring device.

12 Claims, 1 Drawing Sheet

SYSTEM FOR A VEHICLE, COMPRISING AN OPERATING DEVICE DESIGNED TO OPERATE AN ACTUATOR SELECTIVELY ACCORDING TO A VALUE MEASURED BY A MEASURING DEVICE ARRANGED IN A SEAT

FIELD OF THE INVENTION

The present invention relates to systems for vehicles. More particularly, the invention relates to a system for a vehicle, comprising:

- a vehicle seat which comprises a seat part and a backrest defining an accommodating space intended to accommodate an occupant,
- a measuring device of the electromagnetic field type comprising at least one pair of electrodes arranged in the seat part, to generate an electromagnetic field in said accommodating space and to measure at least one value associated with an electromagnetic characteristic of propagation of said electromagnetic field in the accommodating space,
- at least one actuator device (for example an airbag, or other) having several modes of operation,
- and an operating device designed to cause the actuator device to operate selectively according to one of its modes of operation depending on said value measured by the measuring device.

It will be noted that the expression "electromagnetic field" as used here refers to a static or variable electric and/or magnetic field. The expression "electromagnetic characteristic of propagation of the field", as used here, in particular encompasses electric permittivity.

BACKGROUND OF THE INVENTION

Document WO-A-00/25 098 describes one example of such a system, in which the actuator device is an airbag and the measuring device is designed to detect the position of the occupant of the seat.

However, although it is particularly advantageous to provide the airbag operating device with information about the position of the occupant of the seat, it is often necessary to provide this operating device with information regarding the mass of the occupant. In this case, recourse is generally had to other sensors such as strain gauges arranged under the seat part of the seat or in this seat part, which makes the seat more complicated and more expensive.

OBJECTED AND SUMMARY OF THE INVENTION

It is a particular object of the present invention to alleviate these drawbacks.

To this end, according to the invention, a safety device of the kind in question is characterized in that said operating device has a memory in which is stored a mass parameter representing the mass of the occupant of the seat, said operating device being designed to choose the mode of operation of the actuator device according to said mass parameter, and in that the system comprises at least one central electronic unit designed to determine said mass parameter on the basis of said value measured by the measuring device and to transmit said mass parameter to said memory of the operating device.

By virtue of these provisions, the use of additional sensors such as strain gauges can be avoided, this making it possible to simplify the vehicle seat and reduce its cost price. It will be noted that this advantage exists even when the actuator device does not use position information: this is because the information then possibly makes it possible for at least part of the measuring device to be standardized for systems using only the measurement of the weight of the user and those using both the detection of the position and the measurement of the weight of the user.

In some preferred embodiments of the invention, recourse may possibly also be had to one and/or other of the following arrangements:

- the actuator device is an airbag designed to protect the occupant of the seat in the event of an accident, and the operating device is designed to inflate the airbag in the event of an accident;
- the memory of the device for controlling the airbag further comprises at least one position parameter representing a position of the occupant in the seat, this operating device being designed to choose the mode of operation of the airbag according to said position parameter, and said central electronic unit being designed to determine said position parameter on the basis of said value measured by the measuring device and to transmit said position parameter to said memory;
- said central electronic unit belongs to the measuring device;
- the measuring device comprises at least two pairs of electrodes arranged in the seat part of the seat;
- the measuring device further comprises at least one pair of electrodes arranged in the backrest of the seat;
- each electrode of the measuring device is in the form of a sheathed flexible conducting wire of a length of between 10 and 40 cm, the two electrodes of each pair of electrodes being separated from one another by a distance of between 2 and 10 cm;
- the measuring device is designed to generate an electric field in said accommodating space and to measure at least one value associated with a characteristic of propagation of the electric field in said accommodating space;
- said characteristic of propagation of the electric field in the accommodating space is the electric permittivity;
- the measuring device is designed to generate an electric field that is continuous in periods;
- the measuring device is designed to generate an electric field which is continuously variable;
- the mass parameter is a mass category.

BRIEF DESCRIPTION OF THE DRAWINGS

Further features and advantages of the invention will become apparent during the following description of one of its embodiments which is given by way of nonlimiting example with reference to the appended drawings.

In the drawings.

MORE DETAILED DESCRIPTION

In the various figures, the same references denote elements which are identical or similar.

Figure 1:
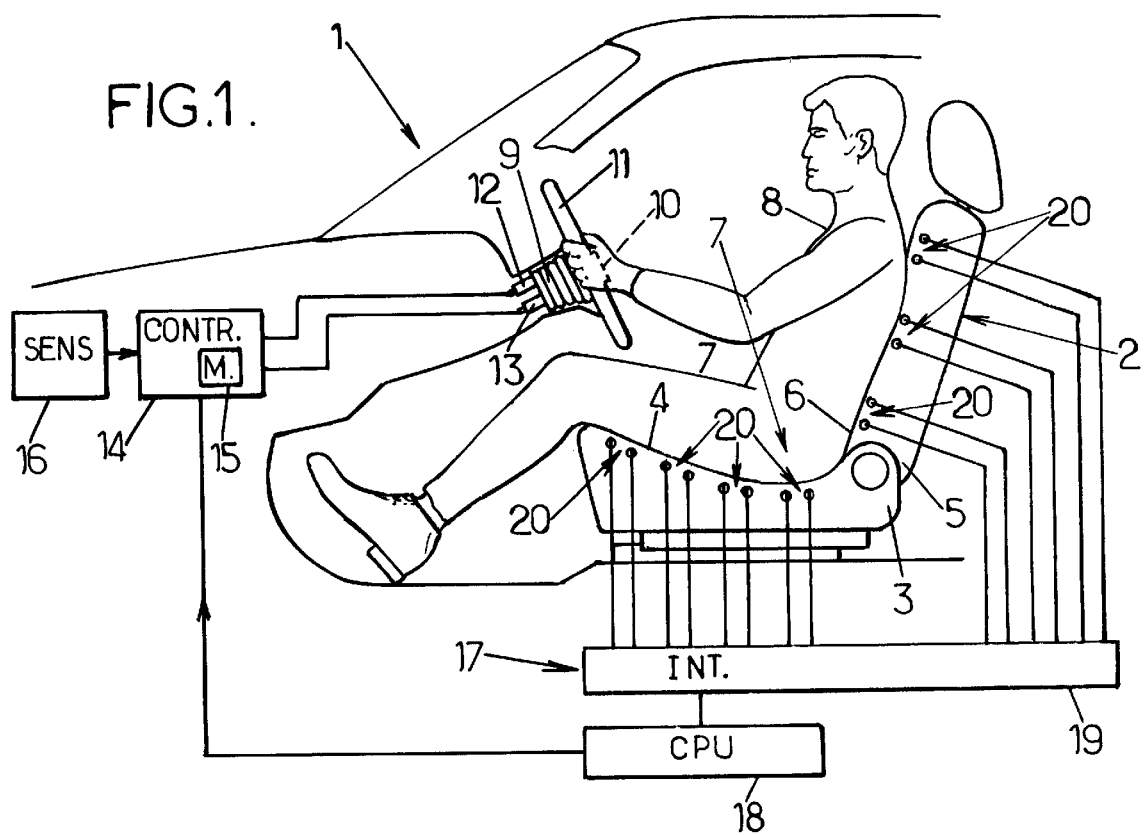
FIG. 1 is a schematic view of a vehicle comprising a system according to one embodiment of the invention.

FIG. 1 denotes a motor vehicle which comprises seats 2, one of which is depicted in FIG. 1, in this particular instance the driver's seat. Of course, the invention could just as easily be applied to the other seats of the vehicle.

The seat 2 comprises a seat part 3 which has an upper resting surface 4 and a backrest 5 which has a front resting surface 6. The seat part 3 and the backrest 5 define an accommodating space 7 situated above the seat part 2 and in front of the backrest 4, which accommodating space is intended to accommodate an occupant 8 of the seat.

In order to protect this occupant 8 in the event of a road accident, the vehicle further comprises one or more airbags, for example an airbag 9 arranged in the central part 10 of the steering wheel 11 of the vehicle.

This airbag has a number of modes of operation, for example two modes of operation depending on which of two explosive charges 12, 13, designed to generate different volumes of gas inside the airbag 9 when it deploys, is initiated.

Initiation of one or other of the two charges 12, 13 is performed by a control device 14 such as an electronic microcontroller (CONTR.), on the basis of information from, in particular:

an impact sensor 16, such as an accelerometer or the like (SENS.), and from a measuring device 17 of the electromagnetic field type.

This measuring device 17 of the electromagnetic field type may, in particular, be of the type described in document WO-A-00/25 098, and make it possible to take a measurement of electric permittivity in the accommodating space so as to determine the position or posture of the occupant 8 in the seat.

Such a measuring device 17, which will not be described again in detail here, may for example comprise a central electronic unit 18 (CPU) such as a microcontroller or microprocessor, connected to at least one interface circuit 19 (INT.) itself connected to one or preferably more pairs 20 of electrodes 21 arranged in the seat part 3 and in the backrest 5.

As explained in the document WO-A-00/25 098 mentioned above, the central unit 18 causes an electromagnetic field, particularly a constant electric field, to be generated in the space 7 by applying a continuous voltage between the electrodes 21 of each pair 20 for successive periods T1. At the end of each measurement period T1, the central unit 18 cuts off the said continuous voltage for a period T2 and measures the charge accumulated through a capacitive effect between the electrodes 21 of each pair 20, which gives a measure of the electric permittivity of the medium 7.

As this permittivity varies according to whether or not the occupant 8 is present and according to his posture, the measurements taken by means of the various pairs 20 of electrodes make it possible to determine both the presence of the occupant and a parameter about the position of the occupant 8, for example a category of position CP of between 1 and 5 and which represents the position of the occupant 8 in the seat. This category of position may be determined for example by calculating a weighted mean of the measurements provided by the various pairs 20 of electrodes at a given moment and by comparing this weighted mean with predetermined thresholds. The coefficients of this weighted mean and the thresholds delimiting the categories of position may be determined for example empirically once and for all for each type of seat.

This determination of a parameter about the position of the user 8 was already known from the document WO-A-00/25 098 mentioned above. According to the present invention, the same measuring device 17 also makes it possible to estimate the mass of the user 8 sitting in the seat, particularly by determining a mass parameter such as a category of mass CM of between, for example, 1 and 5.

As with the category of position, this category of mass CM may be determined for example by calculating a weighted mean of the measurements given by the various pairs 20 of electrodes at a given moment, with weighting coefficients which differ from those used for determining the category of position CP, then by comparing this weighted mean with predetermined thresholds which generally differ from the thresholds used to determine the category of position. The coefficients of this weighted mean and the thresholds delimiting the categories of mass are determined empirically once and for all for each type of seat.

Of course, other methods of determining the categories CP and CM on the basis of measurements given by the pairs 20 of electrodes may be used as the case may be, for example determinations using neuron networks, expert systems, or other methods.

The category of position CP and the category of mass CM determined by the central unit 19 are sent to the operating device 14, preferably after consistency has been checked across several successive measurements. These position CP and mass CM parameters are then stored in a memory 15 (M) of the operating device 14.

These various parameters are taken into consideration by the operating device 14 to determine which of the charges 12, 13 it would trigger in order to deploy the airbag 9 if the sensor 16 were to detect that the vehicle had experienced an impact.

It will be noted that, as appropriate, only the category of mass CM could be determined by the central electronic unit 18 and taken into consideration by the operating device 14 when choosing the mode of operation of the airbag 9.

Figure 2:
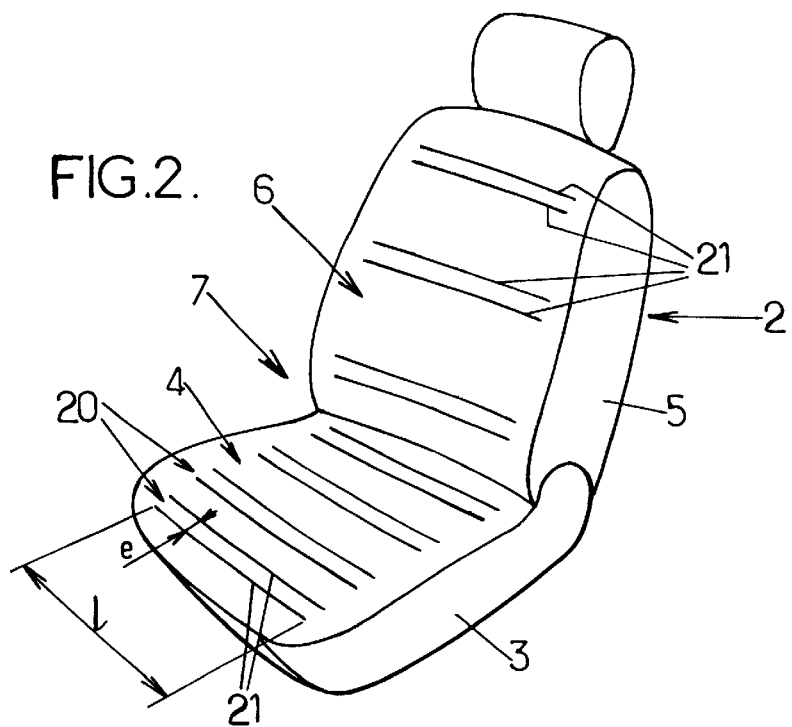
FIG. 2 is a perspective view of a seat belonging to the vehicle of FIG. 1.

As depicted in FIG. 2, the electrodes 21 of the various pairs 20 of electrodes may be arranged transversely in the seat part 3 and the backrest 5 (that is to say at right angles to the fore-aft direction of the seat), preferably near the respective resting surfaces 4, 6 of the seat part and of the backrest. More specifically, the electrodes 21 are arranged immediately under the covers which cover the seat part 3 and the backrest 5, the electrodes 21 being arranged on the foam padding or the like which forms the body of the seat part 3 and the backrest 5, or the said electrodes being embedded slightly in this padding.

In the example depicted, the electrodes 21 of each pair 20 are in the form of flexible conducting wires sheathed with insulating material, extending in a straight line each over a length l of between 10 and 40 cm, the two electrodes 21 of each pair 20 preferably being separated by a distance e of between 2 and 10 cm.

According to the case, all or some of the pairs 20 of electrodes may run in a direction other than the transverse direction or have a shape other than straight, for example in the form of a zigzag, spiral, etc.

In addition, in the example depicted in FIG. 2, the measuring device 17 has four pairs 20 of electrodes in the seat part 3 and three pairs 20 of electrodes in the backrest 5, but the number of these pairs 20 of electrodes could of course be altered without departing from the scope of the present invention. The measuring device 17 could possibly have no pair 20 of electrodes in the backrest, although this arrangement is not preferred. Incidentally, the number of pairs 20 of electrodes arranged in the seat part 3 could, if appropriate, be reduced to 1, and this number is preferably between 2 and 5, it advantageously being possible for the total number of pairs 20 of electrodes arranged in the seat 2 to be between 2 and 12.

It will also be noted that the measuring device 17 of the electromagnetic field type could, if appropriate, be of the type described in document U.S. Pat. No. 6,043,743, which uses a measurement by continuously variable electric field (of the sinusoidal type) rather than a measurement by permanent electric field.

The information from the measuring device can also be used in managing the operation of other parts of the vehicle. Thus, this information could be taken into consideration, for example, in the context of the laws for controlling various actuator devices such as the vehicle suspension, the air conditioning, the brake distribution device, the device for controlling the attitude of the vehicle, etc.

I claim:

1. System for a vehicle, comprising:
   a vehicle seat which comprises a seat part and a backrest defining an accommodating space intended to accommodate an occupant having a mass,
   an electromagnetic field measuring device comprising at least one pair of electrodes arranged in the seat part, to generate an electromagnetic field in said accommodating space and to measure at least one value associated with an electromagnetic characteristic of propagation of said electromagnetic field in the accommodating space,
   at least one actuator device having several modes of operation, said actuator device being adapted to be activated in several different ways corresponding respectively to the several modes of operation,
   and an operating device designed to activate the actuator device selectively according to one of its several modes of operation depending on said value measured by the measuring device,
   wherein the system comprises at least one central electronic unit designed to measure said mass of the occupant on the basis of said at least one value and to transmit a mass parameter representing said mass to said memory of the operating device,
   and wherein the operating device has a memory in which said mass parameter is stored, said operating device being designed to choose the mode of operation of the actuator device according to said mass parameter.

2. System according to claim 1, in which the actuator device is an air bag designed to protect the occupant of the seat in the event of an accident, and the operating device is designed to inflate the air bag in the event of an accident.

3. System according to claim 2, in which the memory of the device for controlling the airbag further comprises at least one position parameter representing a position of the occupant in the seat, said operating device being designed to choose the mode of operation of the airbag according to said position parameter, and said central electronic unit being designed to determine said position parameter on the basis of said at least one value and to transmit said position parameter to said memory.

4. System according to claim 1, in which said central electronic unit belongs to the measuring device.

5. System according to claim 1, in which the measuring device comprises at least two pairs of electrodes arranged in the seat part of the seat.

6. System according to claim 1, in which the measuring device further comprises at least one pair of electrodes arranged in the backrest of the seat.

7. System according to claim 1, in which each electrode of the measuring device is in the form of a sheathed flexible conducting wire of a length of between 10 and 40 cm, the two electrodes of each pair of electrodes being separated from one another by a distance of between 2 and 10 cm.

8. System according to claim 1, in which the measuring device is designed to generate an electric field in said accommodating space and to measure at least one value associated with a characteristic of propagation of said electric field in said accommodating space.

9. System according to claim 8, in which said characteristic of propagation of the electric field in the accommodating space is the electric permittivity.

10. System according to claim 8, in which the measuring device is designed to generate an electric field that is continuous in periods.

11. System according to claim 8, in which the measuring device is designed to generate an electric field which is continuously variable.

12. System according to claim 1, in which the mass parameter is a mass category.

* * * * *